US005528296A

United States Patent [19]

Gove et al.

[11] Patent Number: 5,528,296
[45] Date of Patent: Jun. 18, 1996

[54] JAGGED EDGE COMPENSATOR FOR STAGGERED PIXEL LAYOUTS OF A SPATIAL LIGHT MODULATOR

[75] Inventors: Robert J. Gove; Richard C. Meyer, both of Plano; John R. Reder, Richardson; Scott D. Heimbuch, Dallas, all of Tex.

[73] Assignee: Texas Instruments Incorporated, Dallas, Tex.

[21] Appl. No.: 358,056

[22] Filed: Dec. 16, 1994

Related U.S. Application Data

[63] Continuation of Ser. No. 145,937, Nov. 2, 1993, abandoned.
[51] Int. Cl.⁶ .............................. G06K 9/00; H04N 3/14
[52] U.S. Cl. ........................ 348/275; 348/315; 348/589; 345/144; 345/194; 345/87; 345/136; 395/151; 382/267; 382/269
[58] Field of Search .................................. 348/625, 275, 348/315, 759, 589, 564, 663; 345/84, 87, 141, 143, 144, 194, 136; 395/128, 150, 151, 162; 382/266–269; H04N 3/14; G06K 9/00

[56] References Cited

U.S. PATENT DOCUMENTS

| | | | |
|---|---|---|---|
| 4,437,122 | 3/1984 | Walsh et al. | 382/267 |
| 4,516,154 | 5/1985 | Nishizawa et al. | 348/275 |
| 4,689,660 | 8/1987 | Kashigi | 348/663 |
| 4,712,102 | 12/1987 | Troupes et al. | 345/143 |
| 4,851,825 | 7/1989 | Naiman | 345/143 |
| 4,953,027 | 2/1990 | Tong et al. | 348/625 |
| 5,150,108 | 9/1992 | Markham | 345/143 |
| 5,280,577 | 1/1994 | Trevett et al. | 345/143 |
| 5,293,579 | 3/1994 | Stockholm | 382/269 |
| 5,345,554 | 9/1994 | Lippincott et al. | 395/162 |

FOREIGN PATENT DOCUMENTS

| | | |
|---|---|---|
| 0122098 | 10/1984 | European Pat. Off. . |
| 0177704 | 4/1986 | European Pat. Off. . |

OTHER PUBLICATIONS

Shindo, Hiroyasu, et al., "Microcontrollers for Closed Caption System", IEEE, 1992.
Hurley, N. F., "A Single Chip Line 21 Captioning Decoder", IEEE, 1992.

Primary Examiner—James J. Groody
Assistant Examiner—Cheryl Cohen
Attorney, Agent, or Firm—Julie L. Reed; James C. Kesterson; Richard L. Donaldson

[57] ABSTRACT

A graphics data unit (17) for a digital television receiver (10) that uses a spatial light modulator (16). The graphics data unit (17) has a graphics processor (22), which offloads graphics processing tasks, such as for closed captioning and on-screen display, from a main processor (14). The graphics data unit (17) also has a character memory (24), which stores fonts for closed caption and on-screen display characters. A read-only memory (22a) stores graphics primitives. The character fonts and the graphics primitives may be adapted to compensate for staggered pixel layouts of the spatial light modulator (16).

17 Claims, 3 Drawing Sheets

JAGGED EDGE COMPENSATOR FOR STAGGERED PIXEL LAYOUTS OF A SPATIAL LIGHT MODULATOR

This application is a continuation of application Ser. No. 08/145,937 filed Nov. 2, 1993, which is now abandoned.

TECHNICAL FIELD OF THE INVENTION

This invention relates to television receivers, and more particularly to providing graphics displays on a television display screen.

BACKGROUND OF THE INVENTION

Today's television receivers are increasingly likely to provide special graphics features such as closed captioning and on-screen displays. The information for closed captioning is a part of the standard television broadcast signal, for example, line 21 of the NTSC signal. The information for on-screen displays is provided by a hand-held remote control unit, with which the user changes operating parameters such as channel and volume. The remote control unit transmits infra-red signals, which the television receiver detects to display channel and other control-related information on the display screen.

In existing receivers, devices for detecting closed captioning and on-screen display information provide analog outputs. These devices are suitable for analog displays, such as cathode ray tubes. However, their analog output is not useful for digital displays, such as spatial light modulators, which have an array of pixel elements that are addressed with digital display data. For SLMs, the analog closed captioning and on-screen display signals must be converted to digital form.

Another characteristic of SLMs is the use of "staggered" pixel arrays, in which the pixel elements are not laid out in square grid patterns. These staggered patterns are advantageous in terms of overall picture quality. However, when the image contains a vertical line, the line may appear jagged, an effect that is especially apparent in the characters used for closed captioning and on-screen displays.

SUMMARY OF THE INVENTION

One aspect of the invention is a graphics data unit for a digital television receiver that has a spatial light modulator with a staggered pixel layout. A closed caption detector detects a closed caption component of a television signal and convert it to closed caption data. A graphics processor receives the closed caption data and determines what characters are to be generated. A character generator in data communication with the graphics processor generates pixel data representing these characters. A character memory in data communication with the character generator stores pixel patterns representing said characters, in a form that compensates vertical lines for the effects of the staggered pixel layout.

Other aspects of the invention are features for compensating vertical lines of graphics data and vertical lines in an incoming video signal. For graphics data, a graphics primitive memory stores a line drawing primitive that compensate vertical lines for the effects of the staggered pixel layout. For video signals, the graphics processor detects edges and determines whether they should be compensated.

An advantage of the invention is that the use of a graphics processor for closed captioning and on-screen displays eliminates the need for additional analog-to-digital converters. The result is a less expensive and more versatile receiver.

In addition to closed captioning and on-screen displays, other types of graphics displays can be easily overlaid on, or even substituted for, a television broadcast display. For example, a user could have a picture-in-picture type of graphics sub-display generated by any type of conventional input device.

The SLM may have staggered pixel element arrays, without compromising the accurate representation of graphics displays. Alpha-numeric characters, as well as any other type of graphics image having vertical lines, are more visually appealing.

DETAILED DESCRIPTION OF THE INVENTION

Figure 1:
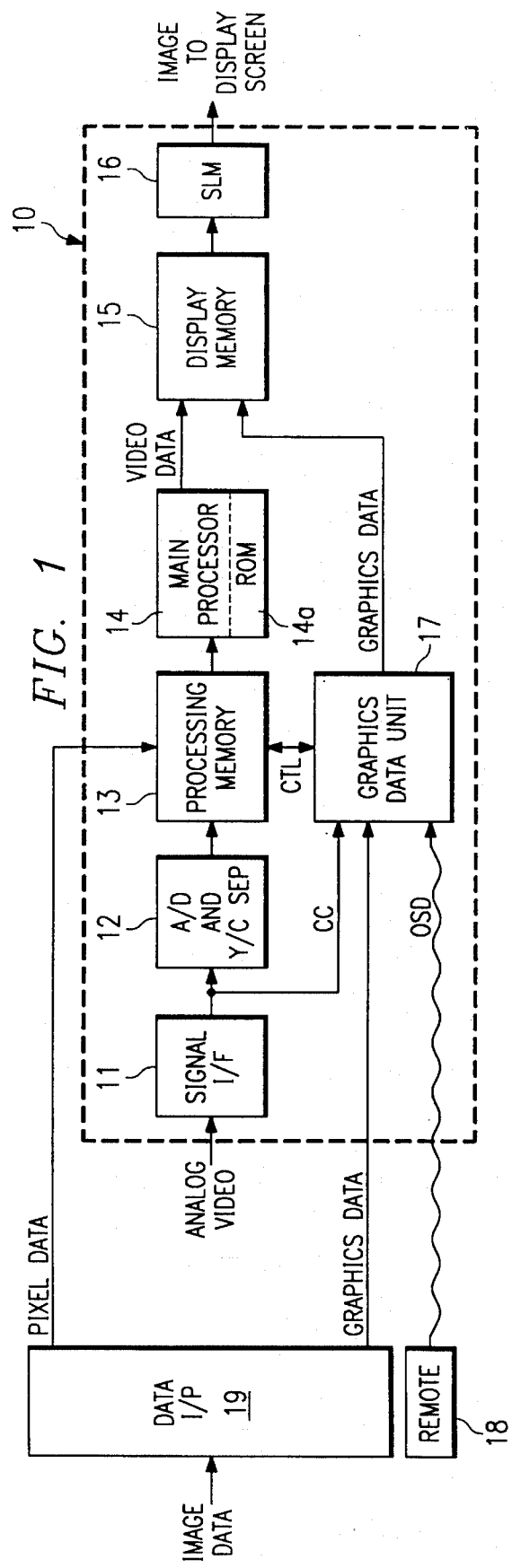
FIG. 1 is a block diagram of a digital television receiver having a graphics unit in accordance with the invention.

FIG. 1 illustrates certain components of a digital television receiver 10. It should be understood that only components used for obtaining output pixel data are shown; components used for tasks such as synchronization and audio signal processing are not shown.

This invention is directed to a receiver 10 that has a graphics data unit 17 in accordance with the invention. A more complete description of the other components, and of the overall operation of an SLM-based digital television system is set out in U.S. Pat. No. 5,079,544, entitled "Standard Independent Digitized Video System" and in U.S. patent Ser. No. 08/147,249, entitled "Digital Television System", both assigned to Texas Instruments Incorporated. These patent applications are incorporated herein by reference.

U.S. patent Ser. No. 07/678,761, entitled "DMD Architecture and Timing for Use in a Pulse-Width Modulated Display System", describes a method of formatting video data for use with a DMD-based display system and a method of modulating bit-planes to provide varying pixel brightness. The use of a DMD-based display system with a color wheel to provide sequential color images is described in U.S. patent Ser. No. 07/809,816, entitled "White Light Enhanced Color Field Sequential Projection". These patent applications are assigned to Texas Instruments Incorporated, and are incorporated by reference herein.

The video input may be any television signal. For purposes of this description, it is assumed that the input signal has a closed caption component.

As an overview of receiver 10, a signal interface 11 provides conventional signal interface functions, such as tuning and filtering. It may also perform tasks such as synchronization signal removal, not related to the subject of the invention.

A/D converter and Y/C separator 12 are shown as a single unit. A/D conversion may be followed by digital Y/C separation, or alternatively, analog Y/C separation may be followed by A/D conversion. In any event, the output of separator 12 is samples of luminance and chrominance data.

Processing memory 13 stores pixel data during processing. Typically processing memory 13 has a field buffer for storing fields of data so that tasks such as motion detection and de-interlacing may be performed.

Main processor 14 performs various video processing algorithms, such as converting the digital signals from color difference signals to RGB, de-interlacing, and degamma correction. Main processor 14 may also be programmed to perform vertical edge compensation, as explained below in connection with FIGS. 9–11. The logic for implementing vertical edge compensation could be implemented with a read-only memory 14a for storing instructions for these tasks or as a logic circuit.

Display memory 15 receives display-ready data and formats it for delivery to SLM 16. SLM 16 is characterized by individually addressable pixel elements, which are capable of being turned on or off simultaneously. Images are formed by addressing those pixels that are to be turned on during an image frame, and by controlling the length of time per frame that each pixel element is on. An example of an SLM is a digital mirror device (DMD) manufactured by Texas Instruments Incorporated. Details of a suitable DMD are described in U.S. Pat. No. 4,956,619, entitled "Spatial Light Modulator", assigned to Texas Instruments Incorporated, and incorporated by reference herein.

A feature of SLM 16 is that it receives data in "bit-planes". In each bit-plane, all pixels of a frame are represented by one bit of data. For example, where each pixel is represented by 24 bits per frame, 24 bit-planes of date are delivered to SLM 16 for each frame. For each pixel element of a bit-plane, its bit of data determines whether or not that pixel element will be on or off during the time assigned to that bit-plane.

A graphics data unit 17 also provides data to display memory 15, but this data represents "graphic" rather than video images. More specifically, graphics data unit 17 provides three types of graphics data: closed captioning, on-screen displays, and user-generated graphics. Typically, closed captioning and on-screen display occupy a predetermined sub-space of a display frame. User-drawn graphics may occupy a sub-space or a full frame. Special features of graphics data unit 17 for generating graphics data are described below in connection with FIGS. 2–8.

A data input interface 19 is in data communication with graphics data unit 17, which has an I/O port for receiving this graphics data. Any type of device for delivering image data to a processor may be used, including a modem for receiving graphics data via a telephone or television cable. The image data could be user-generated, such as with a drawing pad or disk drive. The image "data" may include pixel data or programming from which an image may be generated. Data input interface 19 separates these types of data. Pixel data is delivered to processor memory 13 and follows the main data path. Graphics code is delivered to graphics data unit 17.

The graphics data generated by graphics data unit 17 is delivered to display memory 15, and thereby inserted into the display-ready data stream after the video data has been processed. In particular, all progressive scan processing has already been performed on the video data. Upon output from frame memory 15, each bit-plane of data contains the video data, and the graphics data if any, in appropriate pixel locations. A frame memory 15 for controlling the placement of picture-in-picture subdisplays within a main display is described in U.S. patent Ser. No. 08/160,334, entitled "Digital Memory for Display System Using Spatial Light Modulator", which is incorporated herein by reference. Similar techniques could be used for locating graphics sub-displays.

Figure 2:
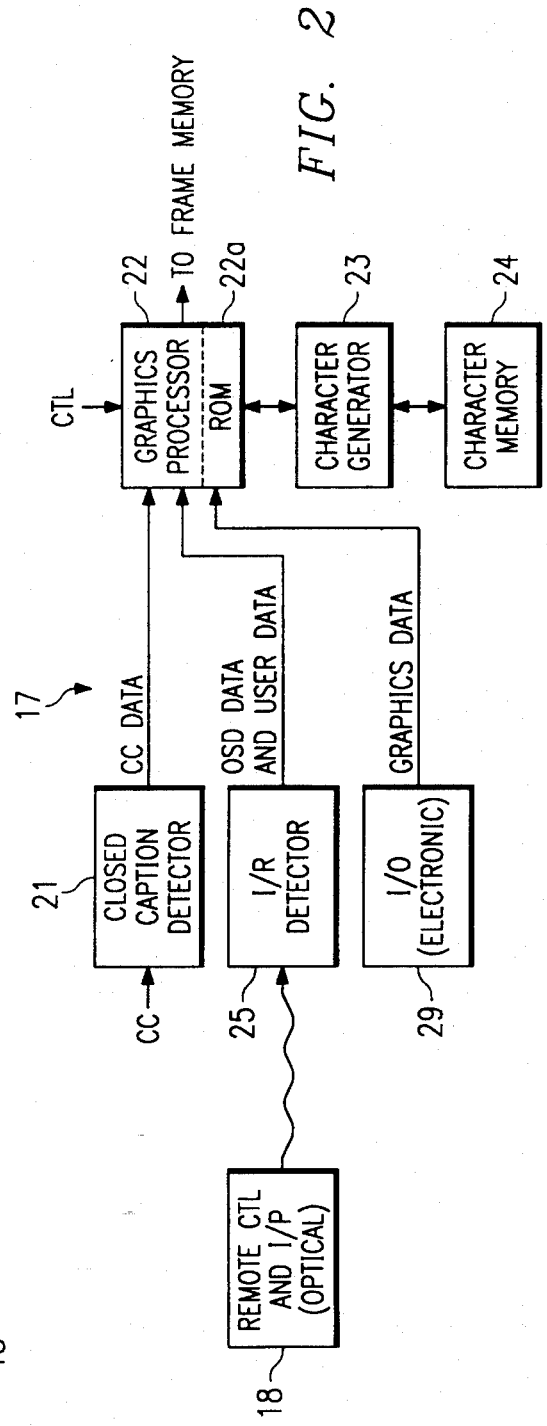
FIG. 2 is a block diagram of the graphics unit of FIG. 1.

FIG. 2 illustrates graphics data unit 17 in further detail. As indicated, graphics data unit 17 is a processor-controlled unit. It has a special graphics processor 22, which performs conventional remote control tasks, and delivers decoded command data to main processor 14 for execution. Graphics processor 22 also facilitates pixel data generation, but handles graphics rather than video data. Although main processor 14 and graphics processor 22 are shown as two different processors, a single processor could be used for both, provided that it has the characteristics described herein.

Graphics processor 22 may be any one of a number of commercially available graphics processors. These processors are programmable and are characterized by features that facilitate graphics displays. For example, graphics processor 22 includes a read-only memory 22a that stores "primitives". These primitives are sets of instructions that permit the pixel data for graphics attributes, such as lines and circles, to be quickly generated. An example of a suitable graphics processor 22 is the TMS340 family of processors manufactured by Texas Instruments Incorporated.

For closed caption displays, closed caption detector 21 detects the portion of the video signal that contains the closed caption information. In the NTSC signal, this information is on line 21. Detector 21 converts this signal to digital form, and delivers it to graphics processor 22, which determines what alpha-numeric characters are to be displayed and where they are to be located on the image frame. The characters are generated by character generator 23, which retrieves them from a character memory 24. Graphics processor 22 associates the character patterns with pixel data and delivers the pixel data to frame memory 15. Graphics processor 22 is synchronized to main processor 14 so that the closed captioning appears on the display screen in conventional manner.

Graphics processor 22 also generates on-screen displays, which are not necessarily limited to alpha-numeric characters. For example, an on-screen display might include a moving "bar" that indicates a volume level. The input for the on-screen display is provided by an infra-red signal from remote control unit 18, as detected and converted to digital code by I/R detector 25. Like the characters for closed captioning, the characters for on-screen displays are generated by character generator 23 using stored patterns from character memory 24.

An advantage of graphics processor 22 is that it may receive graphics data, including graphics generating instructions, from an external source. This data may be received optically via remote control unit 18 or electronically via input device 19.

For optical data input, remote unit 18 is modified to provide standard computer keyboard input, as well as receiver control input. It may also provide "pointing" input, which permits the user to draw graphics by tracing them directly on the display screen.

For electronic data input, graphics processor 22 has an input/output port 29 for receiving downloaded instructions and data. These instructions might call for character generation using character generator 23 and character memory 24. Also, the instructions might call graphics primitives stored in a read-only memory 22a.

Figure 3:
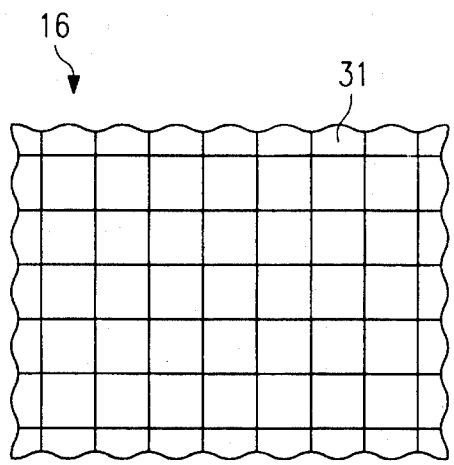
FIGS. 3 and 4 illustrate grid and staggered pixel layouts, respectively.
Figure 4:
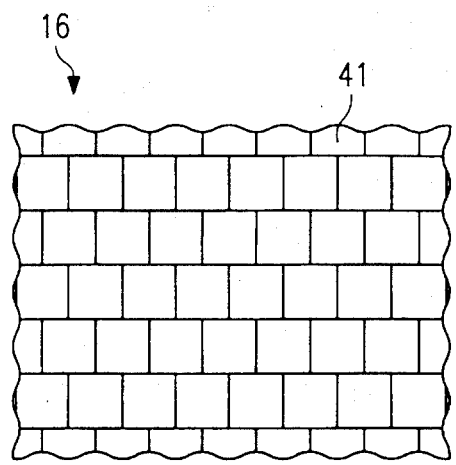

FIGS. 3 and 4 are each a plan view of a portion of SLM 16, and illustrate two types of pixel element layouts. In FIG. 3, the pixel elements 31 are laid out in a grid pattern. In FIG. 4, the pixel elements 41 are laid out in an staggered pattern, in which alternating pixel rows are offset by one-half the pixel width.

Although the staggered type of pixel layout is advantageous in terms of overall picture quality, it can cause visual distortions when used to display industry-standard alpha-numeric character fonts. For example, if the letter "T" were to be displayed using the standard character font, the vertical portion of the "T" would become jagged.

In displays having staggered pixel layouts, jagged vertical lines are avoided by storing the affected characters in a compensated format. That is, all characters having vertical lines are formed so as to reduce the visual distortion. When these alpha-numeric characters are displayed, the result is a more accurate representation of the character.

Figure 5:
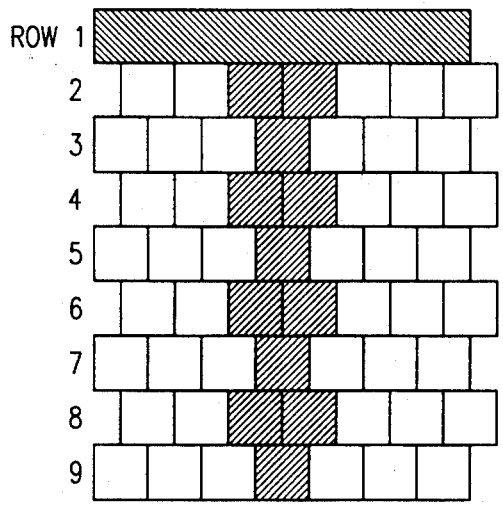
FIGS. 5–7 illustrate how graphics characters are compensated for staggered pixel layouts.

FIG. 5 illustrates how the letter "T" is stored to avoid the jagged edge effect. For purposes of example, the letter is formed by using pixels within a sub-array having a size of 7 by 9 pixels. Some industry-standard fonts are for "non-proportional" spacing, with each letter being formed within a sub-array that is a constant size for each letter. Other industry-standard fonts are for "proportional" spacing, with the letters being formed with sub-arrays that are variably sized. For non-proportional spacing, the pattern and size of the characters are stored in character memory 24. For proportional spacing, the pattern is stored and the size is determined by run-time programming stored in memory 22a. This invention applies to a compensated font set for either type of spacing.

As illustrated in FIG. 5, the horizontal portion of the "T" is formed as in the industry-standard "T", being centered with respect to the center pixel of its row of pixels. However, the vertical portion of the "T" is formed by using an extra pixel on every other line. Where the horizontal portion is on an odd line, each odd line has a center pixel, and each even line has a center boundary. To form the vertical line, the center pixels of odd rows are used. The two pixels adjacent to the center boundary of the even rows are used. If the horizontal portion were on an even line, each even line would have a center pixel and each odd line would have a center boundary. The center pixels of the even rows and the two pixels adjacent to the center boundary of the odd rows would be used.

Figure 6:
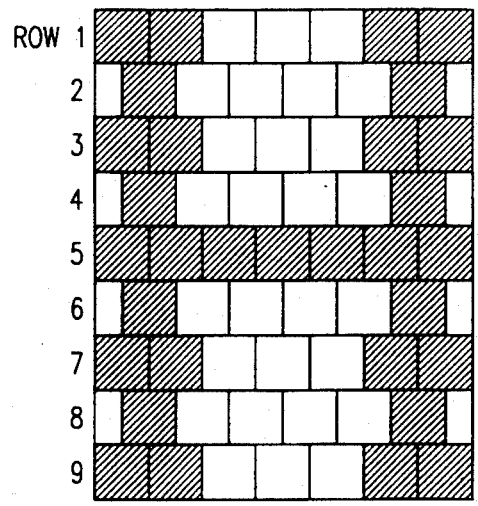

FIG. 6 illustrates a similar process for forming the letter "H". Again, the horizontal portion is formed as with conventional fonts. The vertical portions are formed by using alternating rows of pixels and pixel pairs.

Figure 7:
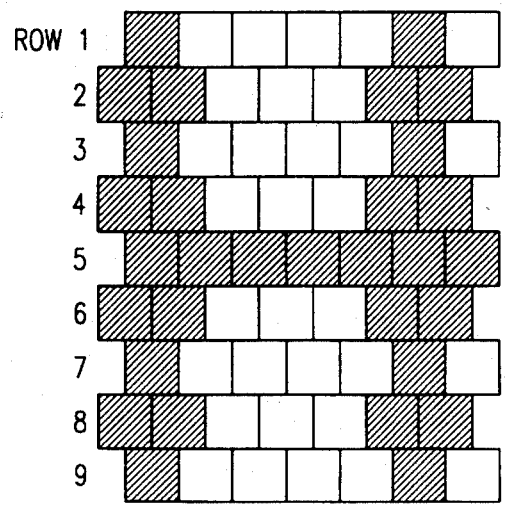

For each alpha-numeric character having vertical lines, the most appealing pattern of pixels is chosen. More than one pattern may be possible for any given character. For example, FIG. 7 illustrates an alternative pattern for the letter "H". However, a common characteristic of the compensated characters is that vertical lines are formed from alternating rows of single pixels and pixel pairs. One set of alternating rows has single pixels that represent the line. The other set of alternating rows has a pair of pixels centered under the single pixel above or below it.

If desired, the pairs of pixels can be made slightly less intense than the single pixels. This "evens" out the pixels so that the vertical line is more likely to appear straight.

Typically, as illustrated in FIGS. 5–7, characters are formed by using single lines of pixels that are one pixel wide. However, the concepts described herein would apply to thicker vertical lines, in which case, an additional pixel would be added on every other row.

Referring again to FIG. 2, graphics processor 22 is programmed to perform a similar vertical line compensation for other graphics displays. When graphics processor 22 receives code calling for a vertical line to be drawn, it calls a graphics primitive, which is programmed so that the vertical line is drawn with an extra pixel on every other line, similar to the vertical lines of characters discussed above. This vertical line primitive may be executed by various types of logic circuits, such as by being stored in memory 22a for execution by processor 22, or by a programmed logic device. The compensation is performed as the lines are drawn.

Figure 8:
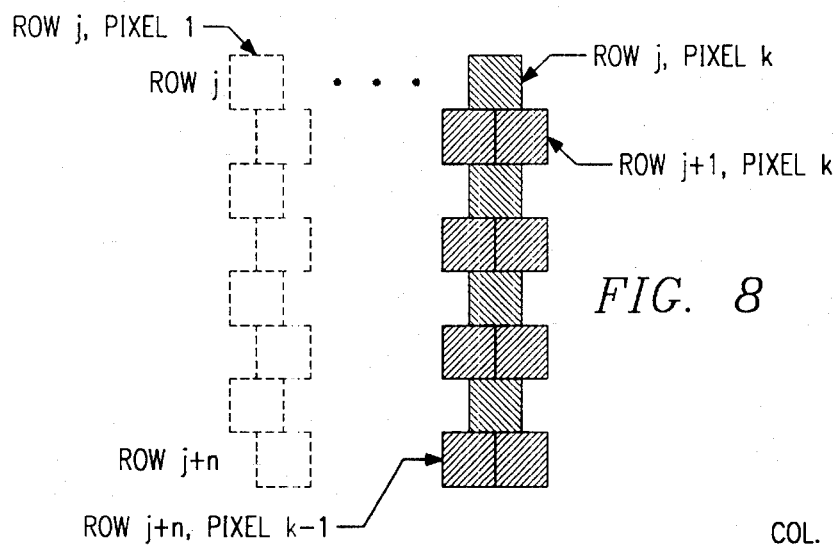
FIG. 8 illustrates how a line in a graphics image is compensated for a staggered pixel layout.

FIG. 8 is an example of a compensated vertical line, as drawn by graphics processor 22. As shown by the first pixel of each row, the pixels are staggered to the right. The uncompensated line would have been drawn with the kth pixel of rows j through j+n. As shown, the kth pixel of alternating lines is offset from the kth pixel above and below it. To compensate for the jagged line that would otherwise appear, on rows j+1, j+3, . . . j+n, pixel k−1 is also used to draw the line. Alternatively, on rows j, j+2, . . . j+n−1, pixel k+1 could be used to draw the line. As is the case with characters, the pixels on the rows having the extra pixel could be made less intense.

Referring again to FIG. 1, main processor 14 could be programmed to perform vertical edge compensation for video data. This compensation is performed "on the fly" for each frame as vertical edges are detected.

For vertical line compensation, main processor 14 first detects when incoming pixel data represents a vertical edge. Known edge detection techniques can be used to detect these edges.

Figure 9:
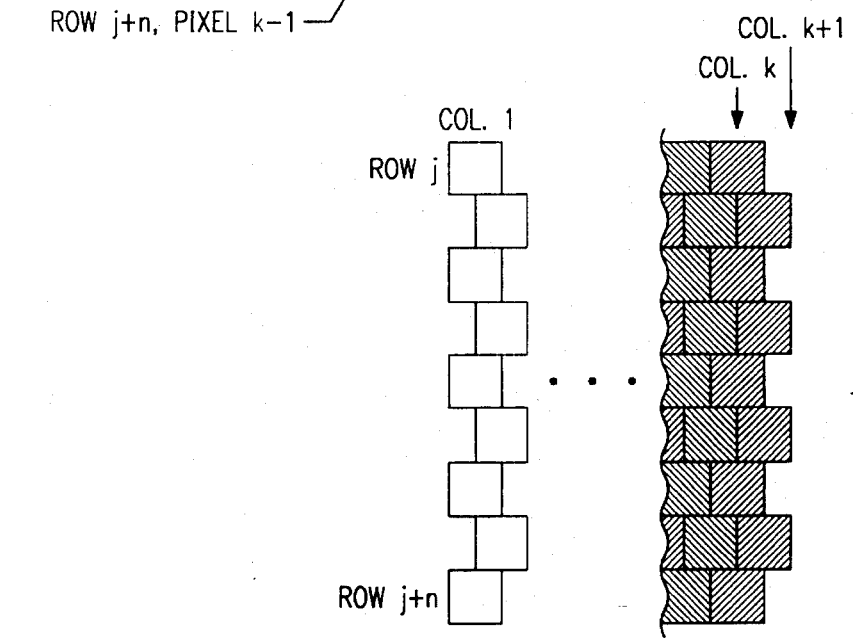
FIGS. 9–11 illustrate how vertical edges represented by incoming video data are detected and evaluated to determine the need to compensated for a staggered pixel layout.

FIG. 9 illustrates a portion of an image, whose pixels represent an uncompensated right vertical edge. For example, this portion of the image might be the edge of a tall building in an image of a city skyline. The staggered pixel layout results in a jagged edge. The kth pixel of rows j through j+n represent the "true" edge as represented by the pixel data. This true edge is detected by using processor 14 to determine that there is a segment of similarly valued pixels in a column (column k), whose values have a high contrast with pixels of an adjacent column (column K+1).

Figure 10:
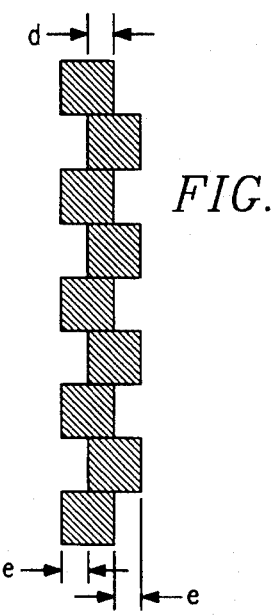
Figure 11:
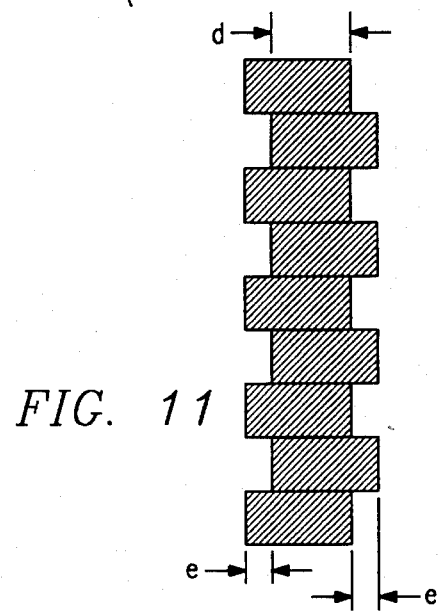

If a vertical edge is detected, main processor 14 then determines whether the edge should be compensated. FIGS. 10 and 11 illustrate how the jagged edge effect increases according to the thickness of an uncompensated vertical line. In FIG. 10, the line is one pixel wide. The line has a "straight" portion having a thickness, d, which is ½ pixel wide. The jagged portions have a thickness, e, which is ½ pixel wide on each side of the straight portion. Thus, the ratio of the jagged thickness, e, to the straight thickness, d, is ½ to ½ (1:1). By compensating the line and adding the next adjacent pixel on every other line, the ratio is changed to ½ to 1 (1:2), a 50% decrease. In FIG. 11, the line is two pixels wide. The ratio of jagged (distance e) to straight (distance d) is ½ to $^{3}$/2 (1:3). By compensating the line, the ratio changes to ½ to $^{4}$/2 (1:4), a 8.33% decrease. Thus, the thinner the line, the greater the jagged edge effect and the greater the desirability for compensation. Thus, main processor 14 has a read-only memory 14a, which stores instructions to detect edges and determine whether they should be compensated. As an example, where edge detection is performed with digital filtering techniques, the bandpass can be varied according to the width of a line desired to be compensated. Alternatively, these functions could be implemented with a programmed logic circuit.

Also, as in the case of graphics data, for compensated lines, main processor 14 may be programmed to vary the intensity of the rows having the extra pixel. For the edges of thicker lines, as an alternative to adding extra pixels, compensation could be performed by varying the intensity of the pixels that "stick out".

Although not shown in FIG. 1, graphics data unit 17 could be used with a receiver 10 that has a CRT display rather than an SLM 16. For such receivers, the data is converted back to analog form and scanned to the CRT instead of being formatted and delivered to SLM 16.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A graphics data unit for a digital television receiver having a spatial light modulator with a staggered pixel layout, comprising:

a means for convening analog video signals to digital video signals and for separating said digital signals into chrominance and luminance components;

a closed caption detector for digitally detecting a closed caption component of a television signal and for converting said television signal to closed caption data;

a graphics processor for receiving said closed caption data and for determining what characters are to be generated;

a character generator in data communication with said graphics processor, for generating digital pixel data representing said characters and determining when compensation is applied to said characters, respectively; and a character memory in data communication with said character generator, for storing pixel patterns representing said characters, wherein said memory stores said characters in a digital form that compensates vertical lines for the effects of said staggered pixel layout using alternating rows of single pixels and pixel pairs.

2. The graphics data unit of claim 1, wherein said graphics processor is in data communication with an instruction memory for storing vertical line drawing instructions that compensate for the effects of said staggered pixel layout.

3. The graphics data unit of claim 2, further comprising an infrared detector for receiving infrared signals from a remote control unit and for decoding said infrared signals into a program for generating graphics images, and wherein said graphics processor executes said program, using said vertical line drawing instructions.

4. The graphics data unit of claim 2, wherein said graphics processor has an input/output port for electronically receiving image data from an external source, and wherein a read-only memory stores programming to decode said image data and associate said image data with said vertical line drawing instructions.

5. A method of using a digital television receiver to display vertical lines on a television display having staggered pixel elements, comprising the steps of:

storing a set of fonts whose vertical lines are compensated for the vertical effect of said staggered pixel elements;

receiving a closed caption signal, wherein said closed caption signal is in digital format;

decoding said closed caption signal to determine what characters are to be displayed;

accessing said characters to be displayed from said set of fonts; and displaying selected portions of selected ones of said characters in a compensated digital format using alternating rows of single pixels and pixel pairs.

6. The method of claim 5, wherein said step of storing said set of fonts is further performed by varying the intensity of pixels of vertical lines on said alternating rows.

7. The method of claim 5, further comprising the steps of:

storing vertical line drawing instructions, which include instructions that compensate for the effects of said staggered pixel elements;

receiving graphics commands that call said vertical line drawing instructions; and displaying at least one vertical line in a compensated format.

8. The method of claim 7, wherein said step of storing vertical line drawing instructions is performed by storing instructions for adding an extra pixel to alternating rows of said vertical line.

9. The method of claim 5, further comprising the steps of:

storing a set of instructions for detecting edges of incoming video data;

storing instructions for compensating said edges for the effect of said staggered pixel elements; and displaying at least one vertical line of an image represented by said incoming video data in compensated format.

10. The method of claim 9, wherein said step of storing instructions for compensating edges is performed by storing instructions for adding an extra pixel to alternating rows of said edge.

11. A graphics data unit for a digital television receiver having a spatial light modulator with a staggered pixel layout, comprising:

an infrared detector for receiving infrared signals from a remote control unit, and for decoding said signal into a program for generating graphic images;

an input/output unit for receiving a program for generating graphic images; and a graphics processor for executing said program, having a memory for storing digital vertical line drawing instructions that compensate for the effects of said staggered pixel layout on selected portions of selected ones of said vertical line drawing instructions using alternating rows of since pixels and pixel pairs.

12. The graphics data unit of claim 11, wherein said vertical line drawing instructions include instructions for adding an extra pixel adjacent to alternating pixels of said vertical line.

13. A digital television receiver for displaying both video and graphics data, comprising:

a main processor for processing video data;

a processor memory for storing said video data during processing;

a graphics data unit having an input-output unit for receiving graphics programming instructions from an external source, a graphics processor for executing said programming instructions, and a memory for storing graphics primitives, wherein said programming instructions include compensating for selected portions of selected ones of characters in said video data by adding alternating rows of single pixels and pixel pairs;

a display memory for receiving processed video data from said main processor and processed graphics data from said graphics processor, and for formatting said processed video data and said processed graphics data into bit-plane data; and a spatial light modulator for receiving said bit-plane data, and for generating images in accordance with said video data and said graphics data.

14. The digital television receiver of claim 13, wherein said graphics data unit has an infrared detector for receiving infrared signals from a remote control unit.

15. The digital television receiver of claim 13, wherein said spatial light modulator has a staggered pixel layout.

16. The digital television receiver of claim 15, further comprising a character memory in data communication with said graphics processor for storing character fonts in a format that compensates vertical lines for the effects of said staggered pixel layout.

17. The digital television receiver of claim 15, further comprising a logic circuit for executing vertical line drawing instructions that compensate for the effects of said staggered pixel layout.

* * * * *